United States Patent Office 3,561,972
Patented Feb. 9, 1971

3,561,972
EGG AND MEAT PET FOOD
John W. Dodge, Ithaca, Gary L. Rumsey, Waverly, and Terry Gray, Batavia, N.Y., assignors to Agway, Inc., Syracuse, N.Y., a corporation of Delaware
No Drawing. Filed Nov. 6, 1967, Ser. No. 680,953
Int. Cl. A23k 1/10; A23j 1/02, 1/08
U.S. Cl. 99—7                                6 Claims

ABSTRACT OF THE DISCLOSURE

Whole raw eggs are cooked to coagulation, cooled to firm condition, diced, the eggs plus .1% to .5% of citric acid by weight of the eggs is added to chopped raw meat, the mixture is placed in containers, sealed under vacuum and retorted at about 250° F. for about ninety-five minutes.

BACKGROUND OF THE INVENTION

The minimum nutritional requirements of a dog are based on average weight of animal and average environmental conditions. Because of this fact, established requirements quite frequently fall below daily demands. Although calorie need is basic, it is the vital nutritional element protein that is most generally lacking and of immediate threat to the organism.

In addition to instances of protein deficiency per se, there are conditions of unusual biological stress, making the demand for protein greater than the established minimums. Such conditions of stress are: (1) Growth, (2) mating, (3) pregnancy, (4) parturition, (5) unusual physical exertion, (6) disease, (7) injury, (8) wound healing.

Under such conditions, a high quality protein regimen would be most desirable. Historically, the use of eggs in animal diets has been advised by nutritionists because of some well founded reasons.

Eggs contain an excellent balance of amino acids essential to animal growth and maintenance. Of all the proteins that have ever been tested, egg protein is needed in minimum amount to maintain nitrogen equilibrium in the adult dog. The assumption is made, therefore, that egg protein supplies the indispensible amino acids in approximately the correct amounts and ratios for the metabolic needs of the body. If a dog is fed enough energy producing foods such as carbohydrates and fats but not protein, there is first a marked loss of protein from the body as the reserves are used up. After this there is a relatively regular loss until just before the death of the dog, when there is a "premortal rise." If during the period of constant level, egg protein is fed, the daily body loss declines indicating that egg protein is superior even to body proteins of the animal itself. Therefore, the "biological value" of egg protein is used as an index of 100 since practically all the nitrogen in egg protein is retained in the body for tissue protein synthesis. Larger quantities of other proteins are needed to meet the requirements for maintenance because they have a relative deficiency in the quantity of one or more of the indispensible amino acids.

The efficacy of incorporating eggs into a pet food regimen has been clearly demonstrated. If now, a source of beef or horsemeat and milk were added to eggs, which would contribute more protein, iron and B-vitamins in addition to palatability so necessary in pet foods, a near perfect nutritional diet would exist.

Pet foods containing eggs and meat have been developed and marketed. It is obvious from the appearance of the canned products that a "hot pack" canning procedure is used. The products are reddish gray, have a slight sulfur odor, and the eggs and meat portions are not readily identifiable. Moreover, because of the method of processing such a "hot pack" product—meaning that the meat portion is cooked in vats prior to filling and sealing the can—many of the natural nutrients of the meat are lost.

BRIEF SUMMARY OF THE INVENTION

This invention has as an object the production of a superior pet food product using eggs and meat as the main ingredients. It has as a further object to provide an attractive product, free from odor and in which the eggs and meat are readily discernible so that the feeder can, by observation, readily determine the percentages of egg and meat portions. A further object is to produce a sterile product in which the meat portion has been heat processed only under vacuum in the same sealed container presented to the end user, accordingly conserving as many of the natural nutrients of the meat as is presently possible for a canned product. The invention also includes the method of making the product.

In general, whole eggs are cooked to coagulation, the eggs are then cooled to firm condition and diced, or cut, into pieces. Before, or after cooking, citric acid is added to the eggs which, in turn, are added to chopped raw meat. The mixture is placed in containers which are sealed under vacuum and retorter to effect sterilization of the mixture.

DETAILED DESCRIPTION

Whole eggs, fresh, frozen, thawed, or reconstituted dried eggs, are cooked to coagulation as, for example, by means of a water bath, steam, hot oil bath, or heat transfer in hot air, as in an oven. After coagulation, the cooked eggs are allowed to cool to a firm product, the temperature of which is usually below 70° F. The firm eggs are then diced, or screened to a desired size, the optimum being cubes, or chunks, with a dimension of between one and two inches.

The cooked diced eggs are added to a meat product. The meat product is ground, or chopped, to the desired particle size, as by being run through a commercial meat grinder having a three-eighths inch blade. The chopped meat may be mixed with any desired additives, such as flavoring, stabilizers, spices, grain products, vitamins, etc., depending on the exact formulation to be met. If so mixed, the mixing is accomplished under vacuum.

If the formulation calls for only light mixing, the diced eggs may be included in this mixing stage. However, it is generally undesirable because the egg particle size is reduced too severely in the mixing operation. Although with light mixing, and with the mixed product being fed to the filler by means of a conveyor, rather than an auger, combining the diced eggs at the mixing stage is acceptable.

The vacuum mixed meat product is transferred to the container filler. If the diced egg product has not been added in the mix, it is fed on a ratio basis into the filler at the same time as the meat.

The egg and meat mixture is placed into containers, usually metallic cans, and the containers are closed and sealed under vacuum. At this point, the product is still cold, the meat has not been cooked and none of the flavor, color, or nutrients has been cooked out of the meat product.

The sealed and vacuumized containers, filled with the end product, are subjected to heat sterilization. This may be accomplished by retorting the containers at approximately 250° F., for approximately 95 minutes. Thereafter, the containers are cooled, labeled and packed into shipping cartons.

In order to provide color and odor control, food grade citric acid, or monosodium phosphate, is added to the eggs either before, or after, cooking. We have found that the addition of from 0.1 to 0.5% of citric acid, or from 0.3 to 0.7% of monosodium phosphate to the eggs by the weight thereof, results in preserving the color of the eggs and eliminating any objectionable odor thereof.

These additives are particularly effective to produce color enhancement. By color enhancement is meant that the egg product is deep yellow at the time of packing and it retains this characteristic until the containers are opened. These color and odor controlled ingredients may be added to the eggs before they are cooked or, if the diced egg particles are small, approximately of ⅛ inch dimension, the citric acid, or monosodium phosphate, may be added to the diced eggs.

The resulting end product has the following advantages over those products utilizing eggs and meat which are commercially available at the present.

(1) The product maintains at color which allows anyone opening the can to readily distinguish the natural pink color of the meat and the yellow color of the eggs.

(2) The product emits no off color or sulfury odor as is the case when a comparable formulated egg and meat based product is hot packed.

(3) The meat portion of the product contains all of the natural meat nutrients normally found in cold packed canned meat. In addition, the product contains the added balanced nutrients of eggs for better maintenance of the animals. In a standard metabolism test involving four dogs over a four day period, the biological value was approximately 95. The National Research Council sets 60 as the minimum value adequate to meet the needs for maintenance and growth.

(4) The product is more attractive to animals than a comparable formulated hot packed product as proved by actual scientifically run palatability studies with animals.

What we claim is:

1. The method of preparing a pet food product comprising cooking whole eggs until coagulated, cooling the cooked eggs to firm condition, dicing the cooked eggs, mixing the diced eggs with raw chopped meat, placing the mixture in containers, closing and sealing the container under vacuum and sterilizing the mixture in the sealed containers.

2. The method as set forth in claim 1, wherein citric acid is added to the eggs in proportions of .1% to .5% of the weight of the eggs.

3. The method as claimed in claim 1, wherein monosodium phosphate is added to the eggs in proportion of .3 to .7% of the weight of the eggs.

4. The method as set forth in claim 1, wherein .25% of citric acid of the weight of the eggs is added thereto before cooking.

5. A sterilized vacuum cold pack pet food product consisting mainly of eggs and meat and containing citric acid in proportions of between .1% and .5% of the weight of the eggs.

6. A sterilized vacuum cold pack pet food product consisting mainly of eggs and meat and containing monosodium phosphate in proportions of between .3% to .7% of the weight of the eggs.

References Cited

UNITED STATES PATENTS

| | | | |
|---|---|---|---|
| 2,593,223 | 4/1952 | Trelease | 99—113 |
| 2,907,662 | 10/1959 | Covey | 99—187 |
| 3,154,423 | 10/1964 | Voegeli | 99—108 |
| 3,383,221 | 5/1968 | Chin | 99—161 |

OTHER REFERENCES

"Spud Coated Wieners," Food Engineering, October, 1955, p. 165.

NORMAN YUDKOFF, Primary Examiner

C. P. RIBANDO, Assistant Examiner

U.S. Cl. X.R.

99—2, 14, 108, 113, 214, 215